Aug. 22, 1939.                T. CATRON                2,170,186
                    HAND GUARD FOR FISHING REELS
                        Filed Aug. 12, 1937
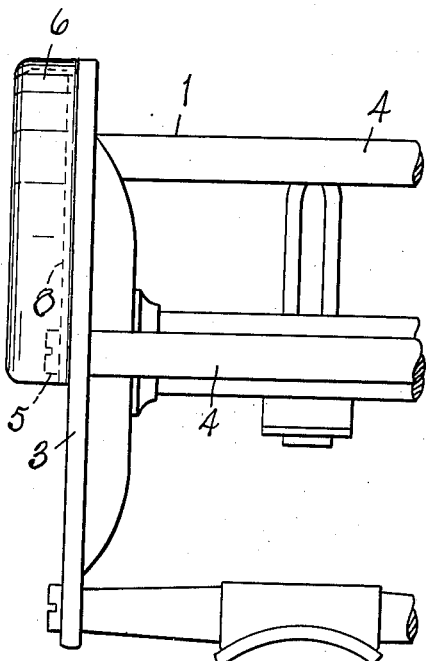
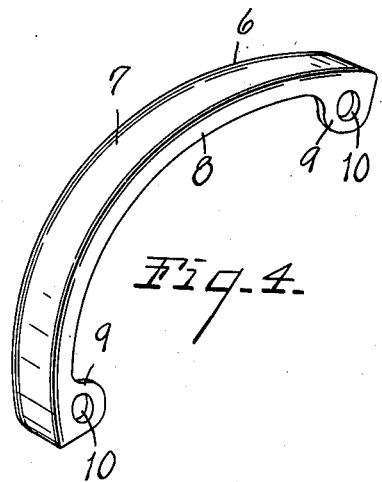
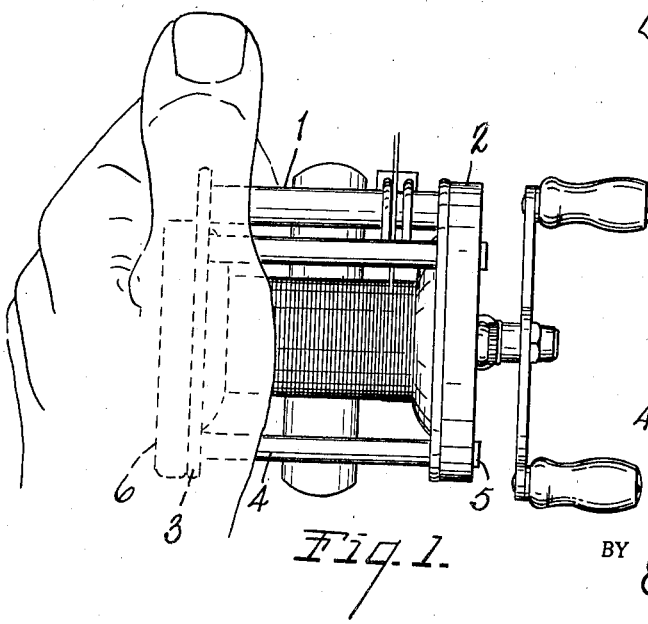
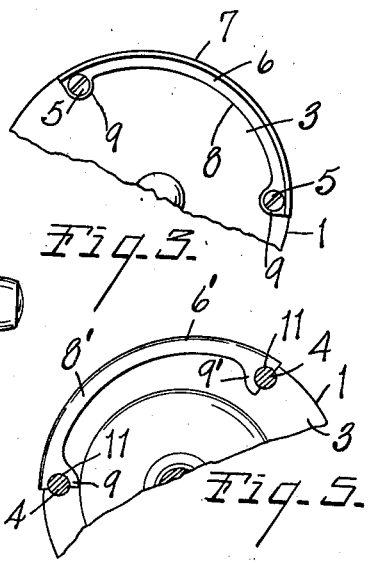
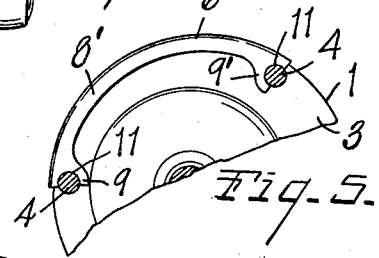
INVENTOR.
Ty Catron
BY Earl T. Chappell
ATTORNEYS Patented Aug. 22, 1939

2,170,186

UNITED STATES PATENT OFFICE 2,170,186

HAND GUARD FOR FISHING REELS

Ty Catron, Dallas, Tex., assignor to Shakespeare Company, Kalamazoo, Mich.

Application August 12, 1937, Serial No. 158,741

3 Claims. (Cl. 242—84.1)

This invention relates to improvements in hand guards for fishing reels.

The main objects of my invention are:

First, to provide a fishing reel embodying a novel and improved hand guard or rest whereby use of the reel is considerably facilitated.

Second, to provide a guard for fishing reels adapted to be quickly and easily associated with a reel without change in the reel structure.

Third, to provide a guard of the type described of flexible nature capable of being quickly associated with the reel by springing action.

Further objects relating to details and economies of my invention will definitely appear from the description to follow. The invention is defined in the claims.

Preferred embodiments of my invention are illustrated in the accompanying drawing, in which:

Fig. 1 is a view illustrating a reel equipped with the provisions of my invention and the manner of utilizing the same, the guard structure and reel tail plate with which it is associated being shown in dotted lines.

Fig. 2 is a fragmentary view of a reel provided with the guard rest of my invention.

Fig. 3 is a fragmentary view in elevation illustrating a reel equipped with the guard device of my invention.

Fig. 4 is an enlarged perspective view of the guard device.

Fig. 5 is a fragmentary view in side elevation and in transverse section illustrating a modified form of my invention.

Referring to the drawing, reference numeral 1 generally indicates a fishing reel of well known type having a head plate 2, a tail plate 3, and pillars 4 extending transversely between the head and tail plates in the usual manner. The pillars are secured between the two plates by screws 5 extending through openings formed in the plates and axially threaded in the ends of the pillars. The above structure, as well as other elements not particularly described, is conventional and forms no part of my invention, except as it is associated with the further details to be described.

My invention consists in the combination with the reel of a hand guard or rest whereby the reel may be conveniently and effectively grasped adjacent the tail plate when it is desired to do so, furnishing a much more secure grip and eliminating the discomfort and unreliability of the grip offered solely by the bare end plate.

Such means consists of a rest or guard member, generally indicated 6, preferably of spring steel or other resilient yet fairly stiff material and having a curved peripheral gripping flange 7 corresponding to the curvature of the periphery of plate 3 or other portion of the reel with which the guard is to be associated. The curved grip 7 is of length partially coextensive with the periphery of the plate 3, although the length of member 6 may be altered as desired. Likewise, the width of flange 7 is susceptible of change, but it is desirable to maintain the proportions of the guard member as small as possible in the interest of reducing weight.

Member 6 is provided with an attaching flange 8 joined to the gripping flange 7 at right angles thereto and extending throughout the length of the member, the flange 8 serving as a stiffening means and also as a means for attaching the guard member to the reel. For the latter purpose, flange 8 is provided with offset ears 9 at its ends, said ears being apertured at 10 in order to receive the pillar securing screws 5, which screws are thus given the double function of locking the guard and the pillars 4 to plate 3.

By the foregoing construction, the simplicity and economy of production of my device are apparent as well as the ease with which the same may be assembled. Alteration of the existing reel structure is avoided and the added structure consists solely of a single member.

In Fig. 5, I illustrate a modified form of my invention wherein the attaching flange 8' terminates in ears 9' having outer end recesses 11 in place of apertures 10, so that the resilient guard member 6' may be attached to the reel simply by springing the same and bringing the recesses into operative relation between and against adjacent pillars 4. In the form of Fig. 5, it is apparent that the flange 8' rests against the inner side of plate 3 as contrasted to the form of Figs. 1, 2, 3, and 4, wherein flange 8 abuts the outer side of plate 3. However, if desired, provision may be made in the form of Figs. 1 to 4 to assemble flange 8 inside the plate with aperture 10 alined with and surrounding screws 5. In such case, the overall width of the reel is slightly reduced. Flange 7 may also extend inwardly of plate 3 if desired.

Fig. 1 demonstrates the convenience and utility afforded by the features of my invention. A firm grip on the reel is assured and the user's thumb is shielded from discomfort. At the same time, the pressure necessary to secure an effective grip on the reel is minimized because of the broad gripping surface afforded.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In combination with a fishing reel having a tail plate and transverse pillars connected thereto, a guard member having a curved peripheral flange and a side flange, said guard member being operatively mounted on the reel with said curved flange flush with the periphery of the plate and partially coextensive peripherally therewith to constitute a hand guard or grip, said side flange lying against the side surface of said plate and having end recesses engaged with said pillars by springing the guard member.

2. In combination, a fishing reel having an end plate and transversely extending members associated therewith and a hand guard or rest member having a curved gripping flange and a side flange, said guard member being operatively mounted with the side flange abutting the plate, one of said flanges having an external recess at an end thereof thrustingly engageable with a transversely extending member by springing the guard member.

3. A hand guard or grip for a fishing reel having transverse pillars comprising a member having a curved outer flange-like grip and a side attaching flange joined thereto, said side flange having open recesses on the ends thereof adapting the member for removable attachment to a reel by springing the member and engaging the recesses with the pillars.

TY CATRON.